J. B. WHITCOMB.
Unloading and Dumping Grain.
No. 160,984. Patented March 16, 1875.
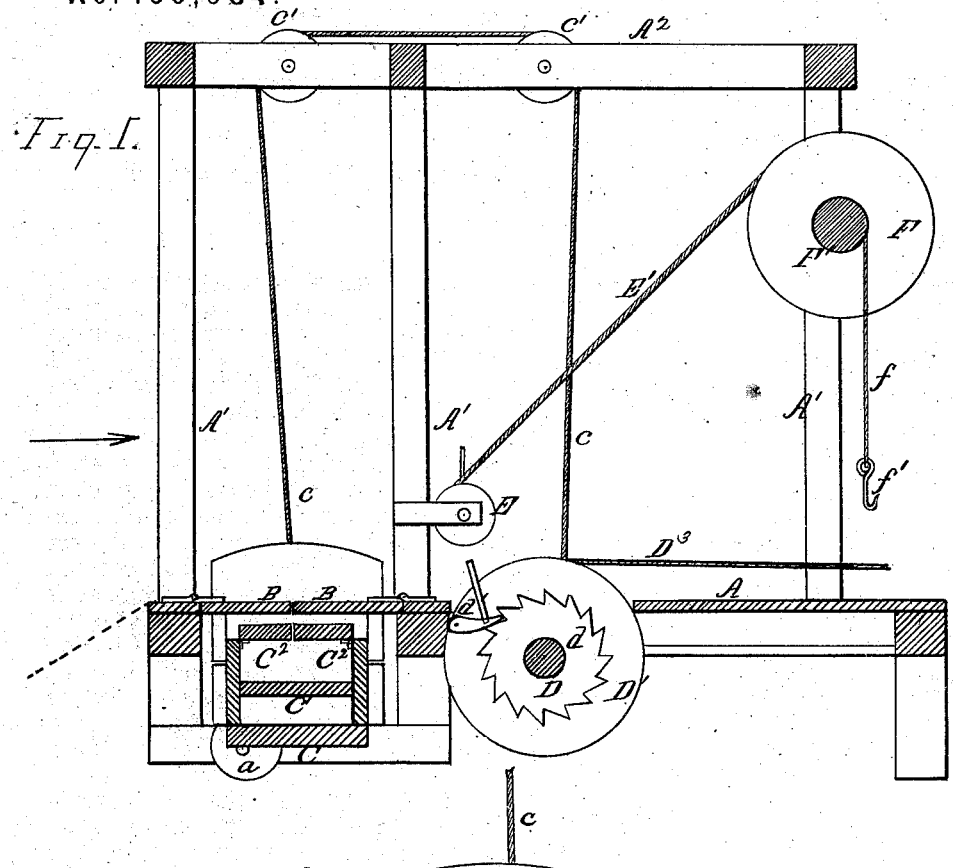
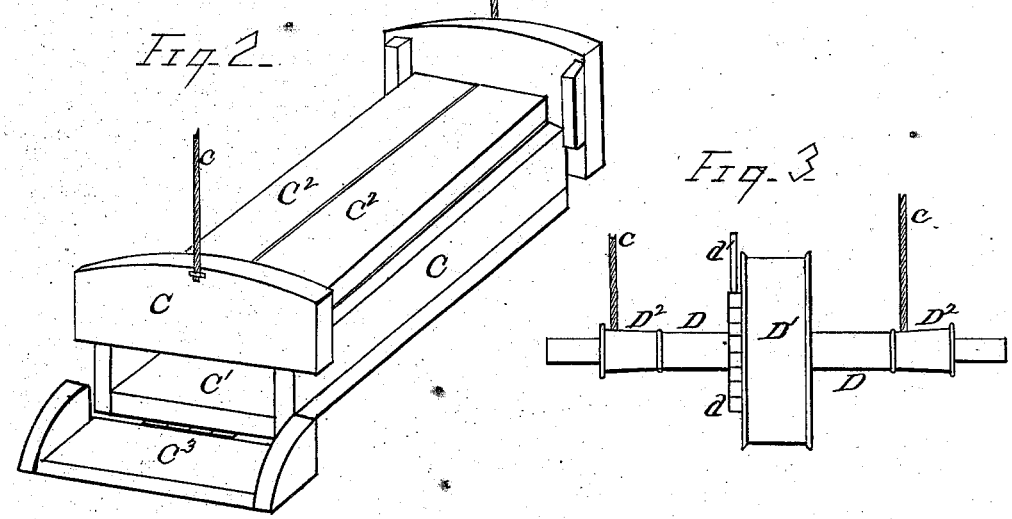
WITNESSES
E. F. Nottingham
R. M. Barr
INVENTOR
John B. Whitcomb
By Leggett & Leggett Attorneys.
THE GRAPHIC CO.PHOTO-LITH.39 & 41 PARK PLACE,N.Y.

UNITED STATES PATENT OFFICE.

JOHN B. WHITCOMB, OF FARMER CITY, ILLINOIS.

IMPROVEMENT IN UNLOADING AND DUMPING GRAIN.

Specification forming part of Letters Patent No. 160,984, dated March 16, 1875; application filed February 9, 1875.

*To all whom it may concern:*

Be it known that I, JOHN B. WHITCOMB, of Farmer City, in the county of De Witt and State of Illinois, have invented certain new and useful Improvements in Portable Apparatus for Elevating and Dumping Grain; and I do hereby declare the following to be a full, clear, and exact description of the invention, such as will enable others skilled in the art to which it pertains to make and use it, reference being had to the accompanying drawings, which form part of this specification.

My invention relates to an improved portable apparatus for elevating and dumping grain into the crib or granary.

In the drawings, Figure 1 is a longitudinal vertical section of the apparatus; Fig. 2, a detached view of the elevating-box; Fig. 3, a detached view of the hoisting-shaft and drum.

My invention has for its object the construction of a simple and effective portable apparatus or mechanism whereby corn and other grain, as it is hauled from the field, may be quickly and easily elevated and dumped in the crib or granary; and consists in a light strong frame-work or platform, provided with suitable apparatus for dumping the load from the wagon, and raising it into the barn, the motive power being derived from the departing wagon, or from a windlass, as hereinafter more fully set forth and described.

A represents a platform, constructed of suitable size and strength to hold a loaded wagon and team, provided at one end with rollers $a$, on which the platform may be carried or adjusted from place to place as occasion may require. Secured to, and forming a part of, the platform are vertical posts $A^1$, three on each side, secured and braced at the top by a frame, $A^2$, adapted to allow the grain to be elevated to the necessary height or place. A portion, B, of one end of the platform A is hinged to form folding doors. Beneath these folding doors B B is the hoisting-box C, Fig. 2, for elevating the grain to its place. This box consists of a trough, C, constructed with an inclined bottom, $C^1$, and hinged folding sides $C^2$. At the deep end of the box C is a weighted or self-operating gate, $C^3$. Beneath the central portion of the platform A is journaled a shaft, D, provided at the central portion with a drum, $D^1$, and at each end with a small cone-shaped or tapered drum, $D^2$. On the side of the drum $D^1$ is a ratchet-wheel, $d$, with which engages a pawl, $d'$. E is a windlass at the side of the frame, which operates a drum, F, on a shaft, $F'$, near the top of the frame $A^1$, by a rope, $E'$. Secured to the shaft $F'$ are two ropes, $f$, provided at their ends with hooks $f'$. Attached to each end of the box C are ropes $c$, which extend up to the top of the frame $A^1$, and over two pulleys, $c'$, and then down, and are secured to the cone-shaped drums $D^2$. The cord at one side of the box being attached to the large end of the drum, and the cord at the opposite side being attached to the small end of the drum, by this means one side (the rear) of the box is elevated a little faster than the other. Secured to and wound upon the drum $D^1$ is a long rope, $D^3$.

The machine being in the position shown in Fig. 1, the doors B B being down, as shown, the wagon-load of grain is driven onto the platform in the direction of the arrow, just passing over the doors B B. The team is then halted, and the ropes $f$, by the hooks $f'$, hooked to the front wheels or body of the wagon. On operating the windlass E the front of the body of the wagon is lifted up. Meanwhile, the doors B have been thrown open, and the sides $C^2$ of the box C raised up. On tilting the wagon the grain is caused to slide down and be delivered into the box C. The wagon is then lowered to its place, the hooks $f'$ detached, and the team driven off for another load. As the team departs the rope $D^3$, secured and wound upon the drum $D^1$, is hooked to the rear axle of the wagon. This causes the drum $D^1$ to revolve, and winds the rope $c$ upon the cone-shaped drums $D^2$, hoisting the box C. One end of the box C is caused to be lifted a little faster than the other, so that by the time the box C is raised to its place to be dumped the rear end is pretty well raised up, which causes the gate $C^3$ to swing open, allowing the grain to escape into the crib or granary. The pawl and ratchet $d$ $d^1$ on the drum $D^1$ prevent the backward movement of the drum $D^1$ and the consequent falling of the box C when the rope $D^3$ is detached from the wagon.

Instead of attaching the rope $D^3$ to the wagon, and using the departing team as a motive power to lift the grain, the rope may be secured to the shaft F, and the box C raised by the windlass E.

Having thus described my invention, what I claim as new, and desire to secure by Letters Patent, is—

1. The portable apparatus for elevating and dumping grain herein described, consisting of the platform A B, frame $A^1 A^2$, self-dumping box C, and elevating mechanism D E F, substantially as and for the purposes described.

2. The hoisting shaft and drum D $D^1$ constructed at each end with cone-shaped portions or drums $D^2 D^2$, substantially as and for the purposes described.

3. In combination with the platform A B and elevating shaft D $D^2$, the trough C, constructed with the inclined bottom $C^1$, hinged folding sides $C^2$, and automatic gate $C^3$, said trough adapted, through the cords c c attached thereto and to alternate ends of the cones $D^2$ on the shaft D, to be elevated to its place, one end slightly in advance of the other, substantially as and for the purposes described.

In testimony that I claim the foregoing I have hereunto set my hand this 2d day of February, 1875.

JOHN B. WHITCOMB.

THOMAS C. DICKEY,
W. G. KIRBY.